Aug. 23, 1938.　　　A. G. RAYBURN　　　2,127,887
TELLTALE SIGNAL LIGHT
Filed Oct. 31, 1934　　　3 Sheets-Sheet 1
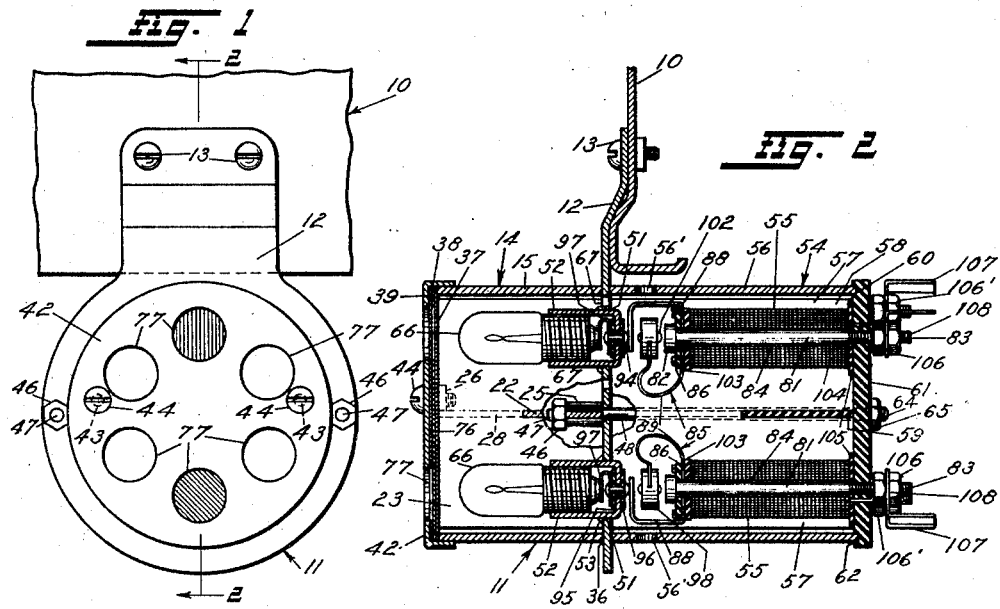
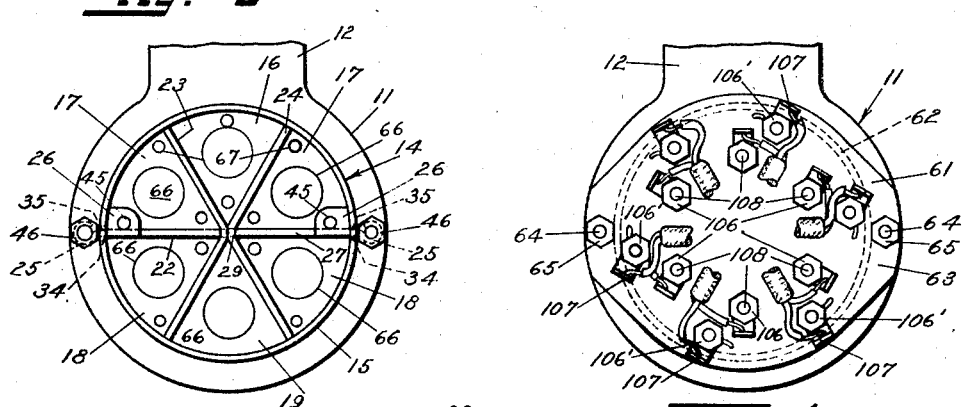
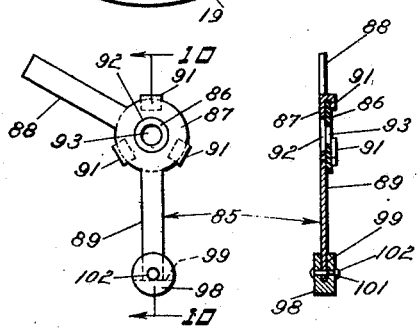
Inventor
Alden G. Rayburn
Strauch + Hoffman
Attorneys Aug. 23, 1938.  A. G. RAYBURN  2,127,887
TELLTALE SIGNAL LIGHT
Filed Oct. 31, 1934  3 Sheets-Sheet 2
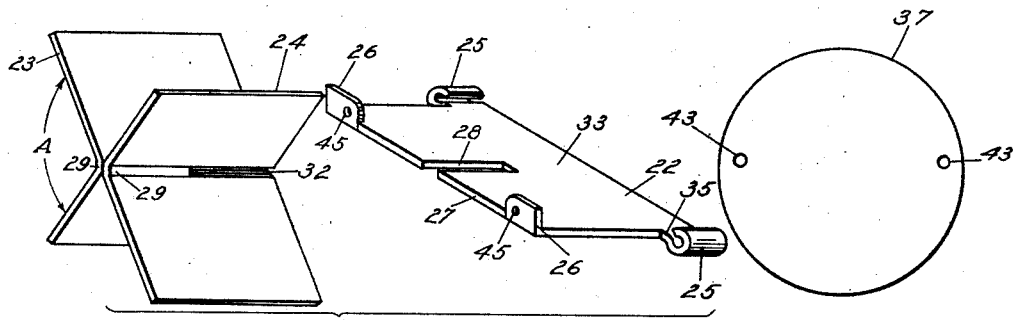
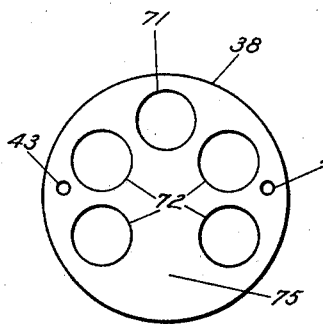
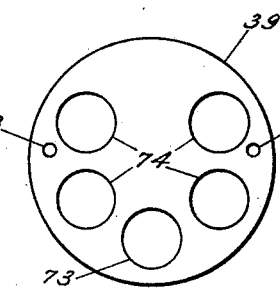
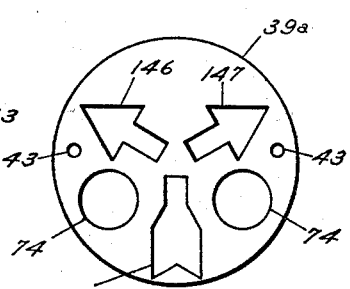
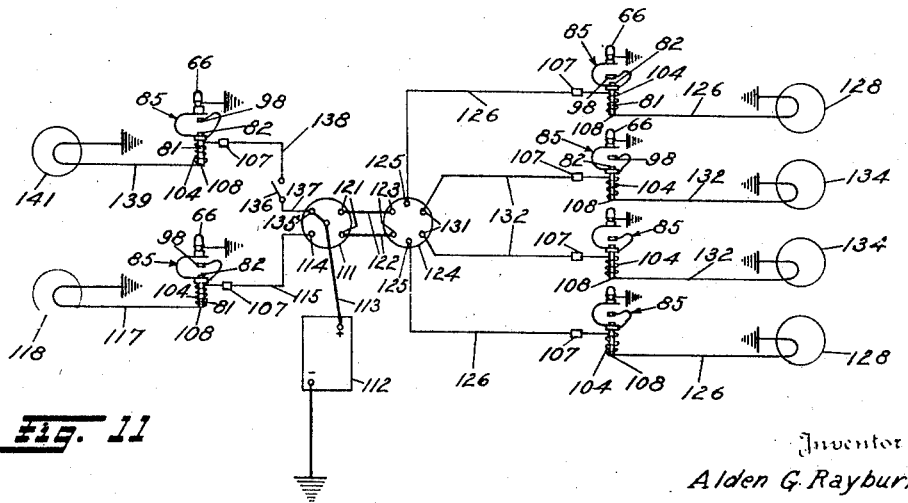
Inventor
Alden G. Rayburn
Strauch & Hoffman
Attorneys Aug. 23, 1938.　　　A. G. RAYBURN　　　2,127,887
TELLTALE SIGNAL LIGHT
Filed Oct. 31, 1934　　　3 Sheets-Sheet 3
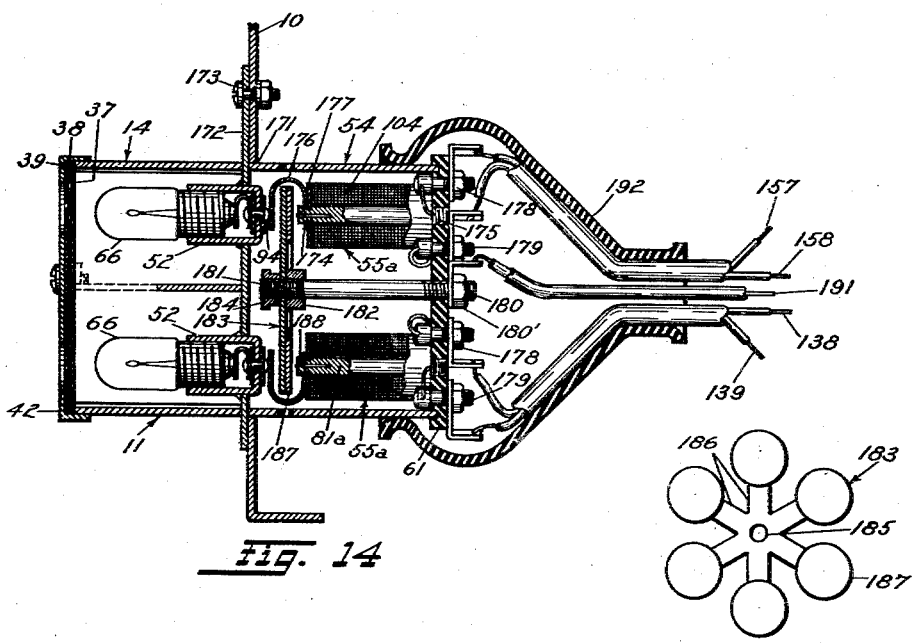
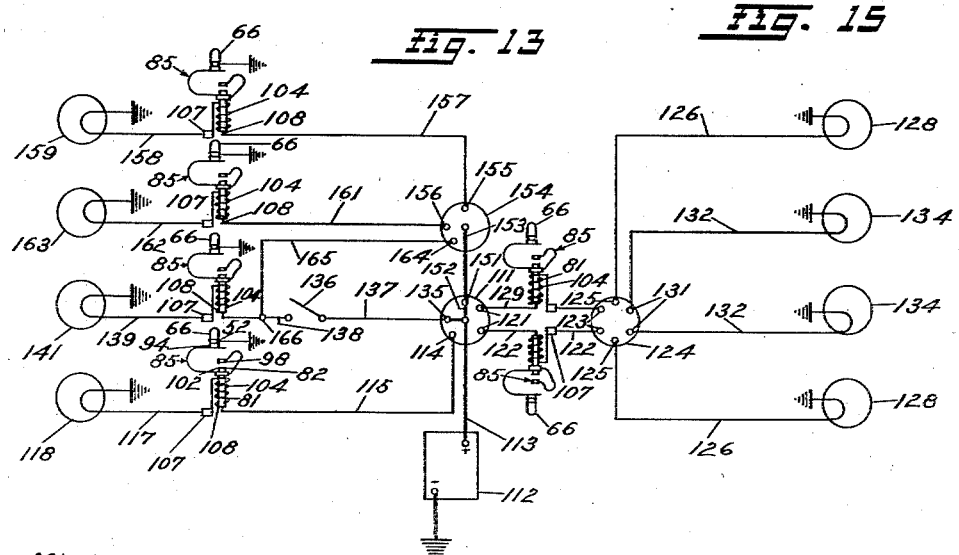
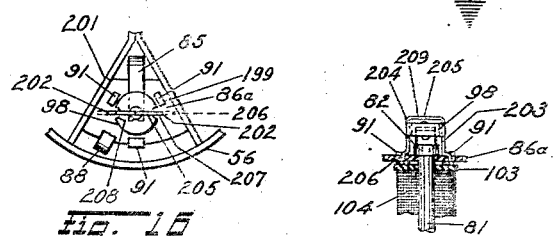
Inventor
Alden G. Rayburn
Strauch + Hoffman Patented Aug. 23, 1938

2,127,887

UNITED STATES PATENT OFFICE 2,127,887

TELLTALE SIGNAL LIGHT

Alden G. Rayburn, Sausalito, Calif., assignor of forty percent to Arthur D. Knox, Nashville, Tenn., and twenty percent to Eddy S. Rayburn, Sausalito, Calif.

Application October 31, 1934, Serial No. 750,900

8 Claims. (Cl. 177—326)

The present invention relates to a system and apparatus for visually indicating the failure of one or more lights of a lighting system.

In particular, the present invention relates to a system and indicator or tell-tale light adapted for use on a motor vehicle to quickly and accurately apprise the operator of the failure of any one or all of the running lights and to indicate which light has failed without the necessity of leaving his position within the vehicle.

The modern motor vehicle's primary running lights, which include the two headlights, tail light, stop light and, in some instances, turn signal lights are often subject to failure without the knowledge of the operator. Failure of the tail light, headlights, stop light or turn signal lights to light for any reason often is the cause of serious accidents due to the high speeds and quick stopping of up-to-date motor vehicles. It is therefor becoming increasingly important under modern highway and traffic conditions for the motor vehicle running lights to remain in perfect operating condition at all times when they are needed. In addition to the above circumstances many states have passed regulations making it a misdemeanor for a vehicle operator to drive a vehicle without proper lights. The present invention is concerned with the provision of a satisfactory indicator light which will warn the operator of the failure of any one or all of his running lights.

Many attmpts have been heretofore made to provide a tell-tale indicator of the character just discussed, but so far no successful indicator has been perfected. The prior attempts have failed to fill the requirements of such a device for many reasons. Chief among the reasons for the failure of the prior devices has been the inability to provide a simple compact device which will function properly without frequent breakdowns. The devices of the prior art have furthermore failed to provide an indicator which will impart the requisite knowledge to the vehicle operator in a manner that will inform him of exactly which light has failed.

The present invention has been developed to overcome the above mentioned objections and others which will hereinafter appear.

It is therefore a major object of the present invention to provide a visible indicator which will be positive in action, simple and compact in structure, and will unerringly and quickly disclose to a vehicle operator exactly which light is not functioning, with a minimum of trouble and inconvenience to the operator.

A further object of the present invention resides in providing an indicator light with a plurality of individually operable bulbs, each of which is adapted to light-up in response to the passage of current through an electromagnet placed in series with the running light whose operation is to be checked.

Another object of the present invention resides in providing an indicator light having a plurality of individual light bulbs with a novel lens structure which is adapted to impart a characteristic and readily recognizable color to each bulb so that a quick glance at the indicator will suffice to apprise the operator of the running light which is associated with each individual indicator light.

A still further object of the present invention is to devise an indicator light having a pair of separate housings one adapted to house the indicator bulbs and the other adapted to house the electrical switches and to secure the housing together in operative relation with each other and to a supporting member in a manner permitting independent removal of the housings to replace and repair the mechanisms housed therein.

Another object of the present invention resides in providing the housing of an indicator light with novel partitioning means.

A further object of the present invention is to devise novel means for dividing the switch housing of an indicator assembly into a plurality of electrically insulated compartments.

A still further object of the present invention is to devise indicator light casing having partitions, a bulb casing and a switch casing which are all mounted on a single supporting member and in unitary assembled relation by a common securing means.

Another object of the present invention resides in providing a dash indicator with a lens structure having a plurality of superposed members which are apertured in predetermined relation to each other in order that the light emanating from the separate compartments will be of a distinct and characteristic color.

A still further object of the present invention is to devise novel electromagnetically operated switches.

A further object of the present invention resides in devising novel electromagnetic switches which constitute unitary assemblies capable of independent removal and replacement in the event of breakage or damage.

A further object of the present invention resides in providing an indicator light with a circuit whereby the indicator bulbs are supplied with current through an independent electric circuit controlled by switches operated simultaneously with the main light circuit.

Another object of the present invention resides in the provision of an indicator assembly employing miniature indicator lights, with means for causing them to operate upon the circuits of the motor vehicle running lights without the necessity of increasing the voltage of the lighting system or dimming the lights to a dangerous or impractical extent.

A still further object of the present invention resides in the provision of an indicator assembly with indicator lights which, upon failure of the filament, will not cause the motor vehicle running light to go out.

Another object of the present invention is to provide an indicator with a novel circuit arrangement, whereby current passing to the indicator bulb alone is insufficient to maintain the indicator light circuit closed.

A further object of the present invention resides in providing an indicator light with an electrical circuit wherein the current to the indicator bulb passes through the electromagnetic switches to provide for augmenting the circuit closing action of the switch.

Another object of the present invention is to devise an indicator light having a plurality of magnetically operated switches disposed in close proximity and designed to prevent magnetic interference, whereby each switch is capable of positive and accurate operation solely in response to its own circuit.

A further object of the present invention resides in the provision of an indicator light that will indicate the failure of operation of a turn signal light as well as the more commonly used running lights.

Still further objects of the invention will appear from the appended claims and accompanying specification when studied in connection with the attached drawings wherein:

Figure 1 is a front elevational view of the preferred form of indicator of the present invention.

Figure 2 is a longitudinal sectional view taken on line 2—2 of Figure 1 when viewed in the direction of the arrows.

Figure 3 is a view similar to Figure 1 with the cover removed.

Figure 4 is a rear elevational view showing the connection of the electrical leads to the contacts of the electromagnets.

Figure 5 is an exploded view of the partitioning members associated with the bulb housing.

Figures 6, 7 and 8 are detailed views of the several members which are assembled in superposed relation to form the novel lens structure of the present invention.

Figures 9 and 10 are detailed views of the spring switch which is carried by the magnetic core.

Figure 11 is a diagrammatic view of the circuit used in the preferred embodiment of the present invention.

Figure 12 is a view of a modified form of lens member which is used when it is desired to incorporate an indication of a turn signal in the dash indicator of the present invention.

Figure 13 is a diagrammatic view of a circuit arrangement used when a turn signal is utilized in the lighting system.

Figure 14 is a view similar to Figure 2 showing a modified form of switch.

Figure 15 is a detail of the switching spider of the modification shown in Figure 14.

Figure 16 is a fragmental plan view showing one of the electromagnetic switches supported in one of the compartments by a modified washer structure.

Figure 17 is a view looking from the front of Figure 16 and showing the stop member associated with the modified washer adapted to prevent undue springing of the electromagnetic movable contact member.

With continued reference to the drawings wherein like reference numerals indicate the same parts throughout the several figures and with particular reference to Figures 1-10 the numeral 10 indicates a dash board or other appropriate structure in the driving compartment of a motor vehicle. An indicator light designated broadly by the numeral 11 is suspended from the structure 10 by means of a supporting or mounting plate 12 which is secured to the structure 10 by means of nut and bolt assemblies 13. Although the indicator 11 is shown in the drawings as being suspended from structure 10 it will be understood that if desired a suitable aperture may be formed in the structure 10 and the indicator may then be placed therein in a manner well known in the art.

The indicator 11 comprises a housing 14 which in the present instance takes the form of an open ended cylinder 15. The cylinder 15 is adapted to be divided into a number of individual compartments 16, 17, 18 and 19 by means of division plates 22, 23 and 24. Plate 22 as shown in Figures 3 and 5 comprises a flat sheet metal plate provided at two corners with loops 25, the purpose of which will hereinafter appear. Plate 22 at its remaining corners is provided with two ears 26 which are preferably integrally formed therewith and then bent into a plane normal to the faces of the plate. Ears 26 are adapted when in their final bent position to lie flush with an edge 27 of plate 22.

Plate 22 is provided with a longitudinally extending slot 28 which as shown in Figures 2 and 5 extends approximately half-way through the plate. Slot 28 is of a width sufficient to snugly receive abutting central strips 29 of plates 23 and 24. Strips 29 are slotted at 32 to snugly encompass cross piece 33 of plate 22. Plates 23 are preferably of sheet metal and are bent to the form shown in the drawings prior to their association with plate 22. The preferred angle of bend is 120° as shown by angle "A" in Figure 5. With plates 23 and 24 associated with plate 22 as above described the unit is placed within cylinder 15. Cylinder 15 is provided with diametrically opposite slots 34 (Figure 3) which are adapted to receive short necks 35 formed between the main body portion of plate 22 and loops 25 carried thereby. Slots 34 permit plates 22, 23 and 24 to be drawn up flush with end 36 of cylinder 15.

The opposite end of cylinder 15 is closed by superposed translucent plates or disks 37, 38 and 39 and by apertured metal cover 42. Translucent disks 37, 38 and 39 and cover 42 are provided with aligned apertures 43 which are adapted to receive cap screws 44 which are screw threadedly received in apertures 45 provided in ears 26. It will therefor be seen that when cylinder 15, partitions 22, 23 and 24, disks 37, 38 and 39 and cover 42 are assembled as above pointed out the housing 14 comprises an assembly which can be handled and assembled as a unit. This unitary structure need not be disassembled except to replace the lenses.

Housing 14 is secured to support 12 by means of nuts 46 which are received on threaded ends 47 of studs 48 which are threaded into and secured in apertures formed in support 12. In the preferred embodiment of the invention only two studs 48 are used and threaded ends 47 are passed through loops 25 and nuts 46 are screwed down to firmly secure loops 25 between nuts 46 and support 12 to thereby secure housing 14 in place upon support 12.

Support 12 is provided with a plurality of apertures 51 which are adapted to receive light sockets 52. Sockets 52 are secured to support 12 in any suitable manner such as welding shown at 53 on the drawings. Each aperture 51 and its associated socket 52 are designed so that there will be a socket in each of the compartments formed in housing 14.

Support 12 also carries a housing 54 which provides protection for a plurality of electromagnetic switches 55. In the present preferred embodiment housing 54 comprises a cylindrical body portion 56 provided with six ventilation holes 56'. Body 56 is divided into a number of electrically isolated individual compartments 57. Compartments 57 are equal in number to the light sockets 52 and compartments 16, 17, 18 and 19 of housing 14. Compartments 57 are formed by division plates 58 and 59 of fibre board, hard rubber or some like electrical insulating material. Plates 58 are identical to plates 23 and 24 in shape and structure and cooperate with plate 59 in the same manner as previously described in connection with the housing 14. Plate 59 differs from plate 22 in that the ears 26, necks 35 and loops 25 are omitted, in other respects the plate is the same.

The open end 60 of housing 54 is closed by a cover 61 of insulating material such as Bakelite or the like. Cover 61 is provided with an annular centering groove 62 which receives end 60 of cylinder 56 in a manner providing a liquid tight joint. As seen in Figure 4 cover 61 is roughly in the form of an ellipse, the major axis of which is of a length equal to the diameter of support 12. Due to this shape cover 61 provides ears or projections 63, which are suitably apertured to receive theaded ends 64 of studs 48. Nuts 65 are threaded on ends 64 and are adapted to draw cover 61, housing 54 and partition members 58 and 59 into assembled relation upon support 12 with the compartments of the two housings 14 and 54 in alignment.

From the preceding description it will be seen that housing 14 and 54 can be separately removed by merely removing their respective assembly nuts 46 and 65. Due to this construction either of the housings may be removed to permit access to the mechanisms housed thereby without removal of the other housing or the entire indicator 11.

As pointed out in the preceding detailed description each compartment of housing 14 is provided with an individual socket 52 and each socket 52 has an independent electromagnetic switch 55 associated therewith. In the embodiment of the invention now under discussion sockets 52 are preferably provided with standard miniature 6 volt 0.15 ampere light bulbs 66. Each switch 55 and its associated bulb 66 is associated with a separate running light circuit and the compartment in which the different indicator bulbs are mounted is preferably chosen so that its position will of itself aid the operator in determining which running light is indicated by the lighting of each miniature bulb. In the preferred arrangement compartment 16 is lighted by operation of the tail light bulb and the light emitted therefrom is of a characteristic red color. Compartments 17 are adapted to show the proper functioning of the left and right hand head light distance bulb or beam and compartments 18 the left and right hand head light city driving bulb or beam. The light from compartments 17 and 18 is therefor preferably of a characteristic white color. Compartment 19 indicates the operation of the brake stop light and the light emitted therefrom is preferably green so that it may emit a characteristic color different from the others. Compartments 16, 17 and 18 are provided with ventilation holes 67 which permit the heat generated by bulbs 66 to escape. From the above description it will be clear that the position and color of the light from each compartment combine to form an indication that is quickly and readily recognizable by the vehicle operator so that a close scrutiny of the indicator is not necessary.

The novel lens structure more completely disclosed and claimed in applicant's copending application Serial No. 163,133 filed September 9, 1937, for obtaining the characteristic coloring which forms a part of the present invention will now be described. As previously pointed out, the lens of the present invention comprises three superposed disks 37, 38 and 39. Disk 37, shown in Figure 6, is preferably imperforate except for apertures 43 for receiving screws 44. This disk is adapted to emit light of a white color and is preferably formed from a semi-transparent artificial resin product or a clear resin product frosted on one or both sides. Such a product tends to eliminate glare and the liability of breakage, and is sold on the market under the name of "Catalin". It will be understood that glass celluloid, or other suitable material could be used in place of Catalin if desired.

Disk 38, Figure 7, is preferably of green Catalin and is provided with apertures 71 and 72 of circular contour and about ⅜" in diameter. These apertures are equally spaced from the center of the disk and the apertures 72, being four in number, are disposed above and below the horizontal center line at an angle of 30° therefrom. The aperture 71 is disposed on the vertical center line adjacent the top of disk 38 so that the apertures which are five in number are located at points directly over the individual compartments of housing 14. This plate is superposed upon disk 37 with the apertures 43 of each disk in alignment.

The remaining disk 39 is preferably of red Catalin and it is provided with apertures 73 and 74 of slightly smaller size than apertures 71 and 72 of disk 38. Apertures 73 and 74 are disposed in an angular relation identical to that of the disk 38 and the apertures 43 thereof are aligned with apertures 43 of disks 37 and 38. This disk is superposed upon the disk 38 with apertures 74 in alignment with apertures 72 of disk 38 and the aperture 73 overlying the imperforate lower portion 75 of disk 38. The three disks are retained in their above-mentioned superposed angular relation and are placed within the cover 42 with the red disk 39 in contact with the inside face 76 of cover 42. Cover 42 is provided with six apertures 77 in alignment with and corresponding in shape to, but slightly smaller than apertures 71, 72, 73 and 74 of disks 38 and 39. Apertures 43 provided in cover 42 are disposed in alignment with apertures 43 of the disks 37, 38, and 39 and the screws 44 are passed freely through these apertures and screwed into the ears 26 of plate 22 to maintain the disks and cover in their proper superposed and angular positions upon housing 14.

From the above description it will be seen that since apertures 72 and 74 of disks 38 and 39 are disposed in alignment with each other and with apertures 77 of cover 42, the light emanating therefrom will be of a non-glaring white color, since it passes only through the imperforate disk 37. These apertures indicate the head light beams, the apertures on the left corresponding to the left head light and those on the right to the right head light. Since the present day motor vehicle is usually provided with adjustable beam headlights, it is desirable to have a device for indicating whether they are operating properly. In the present invention the upper aligned apertures 72, 74 and 77 indicate the condition of the road driving or distance beam of the respective headlights, and the lower aligned apertures 72, 74 and 77 indicate the condition of the city or lower driving beam of the respective head lights.

The remaining apertures 77 give off different colored light due to the following structure. As described above, the aperture 73, (aligned with lowermost aperture 77) overlaps the imperforate portion 75 of disk 38 and therefore the light emanating therefrom is of a non-glaring green color. This aperture indicates the operation of the brake stop light. The upper aperture 77 emits a red light since aperture 71 of disk 38 lies beneath the imperforate portion of the red disk 39. This aperture indicates the operation of the tail light and corresponds in color thereto.

By the above construction it will be appreciated that a very simple and effective method of identifying the running light which is indicated from the separate compartments is provided. It will also be apparent that both the position and color of the different compartments aids the driver in reading the indicator in a quick and accurate manner.

The detailed construction of the novel electromagnetic switches 55, more completely disclosed and claimed in applicant's copending application Serial No. 163,132 filed September 9, 1937, used to independently light the compartments of housing 14, will now be set forth. Since all of the switches are identical in their major details of construction, only one will be described. As seen in Figure 2, switch 55 comprises a core 81 having an enlarged head 82 and a threaded extension or end 83. Core 81 is first provided with an insulating covering 84 of paper or like material and a non-magnetic spring metal contact member 85 having a washer 86 of rubber or fibre telescoped thereon, with washer 86 in contact with head 82. Member 85 is preferably copper and comprises an enlarged body portion 87 having a pair of relatively narrow outwardly extending arms 88 and 89. Body 87 is also provided with three ears 91 spaced 120° apart and adapted to be bent over and crimped down upon the washer 86 as seen in Figure 10. An enlarged hole 92 is provided in body 87 and a smaller hole 93 concentric with hole 92 is provided in washer 86. Hole 92 is of such size that core 81 and its insulating covering 84 may pass freely therethrough while the hole 93 is adapted to snugly fit the covering 84. Member 85 is supported upon the core 81 through washer 86 which prevents electrical contact between core 81 and member 85. Arm 88 of member 85 is bent into substantially U-shape (Figure 2) and is adapted to make contact with the centrally disposed contact 94 of socket member 52. Contact 94 is electrically insulated from the body of socket 52 by the cooperation of washers 95 and 96. A spring contact 97, secured to contact 94, makes contact with the central contact of the light bulb which is grounded through its outer shell, casing 52, plate 12 and dash 10 to the frame of the vehicle.

The other leg 89 of member 85 is provided at its end with an iron cylinder 98 or other magnetic material. The cylinder 98 is preferably slotted at 99 and the end of arm 89 is snugly received therein. A suitable aperture 101 extends through cylinder 98 and arm 89 and a rivet 102 preferably of copper is placed therein to retain the member 98 on arm 89 and to also provide an electrical contact. Due to the small size of contact 102 and the fact that it is made of copper, there is little tendency for it to hang upon deenergization of coil 104. Arm 89 is bent as shown in Figure 2 and the clearance between it and head 82 is carefully adjusted so that member 98 and its contact 102 lie directly over and close to the head 82 of core 81. If desired, head 82 may be provided with a copper contact to thereby insure clean and rust-proof contacts.

With member 85 constructed as described above and placed in position, a fibre washer 103 is placed on core 81 in abutment with the other face of body 87. This construction completely insulates the member 85 from contact with any portion of core 81. If desired washers 86 and 103 may be formed integral by molding them around member 25 to thereby form an integral insulating structure at this point. A fibre or like washer 105 is then threaded on extension 83 to retain the coil in place and provide an insulated end for the assembly. The coil 104 of suitable wire is now wound on the core 81 by means of a coil winding machine in a well known manner. End 83 of core 81 is then threaded into cover 61 and a locking nut 106 is placed thereon. The entire switch assembly 55 is secured to and supported by cover 61 as will be clear from the drawings. The ends of the coil 104 are carried through suitable apertures in cover 61 and secured to contact members 107 and 108 respectively. Contact 108 is made through extension 83 of core 81 by clamping one end of the wire used to wind coil 104 under lock nut 106 and contact 107 is made by clamping the other end of the wire of coil 104 under a nut 106' on contact post 107. Washer 103 also prevents the wire of coil 104 from making contact with member 85. It will therefor be seen that upon removal of nuts 65 the housing 54 and cover 61 can be removed from support 12 and cover 61 and electromagnetic switches 55 can be removed from cylinder 56 to permit inspection and repair.

As previously pointed out, the switches 55 are for the most part identical in construction, the only difference being in the wire used in winding the coils or the number and direction of turns used on the different coils. After experimenting with switches of the above character it was found that in order to obtain positive and practical operation of an indicator, the coils of the electromagnets had to be varied. If switches of identical structure were used in all of the circuits, it was found that the vibrations of the vehicle would cause the indicator bulbs in certain of the circuits to flicker when the switches were closed since the current passing through the coils of these switches to the running lights was insufficient to hold the switches in proper electrical contact against spring 85 and road vibration. If the coils were increased in size to overcome this difficulty the switches that operated satisfactorily before would become unnecessarily heated and a serious dimming of the running lights resulted. To overcome these disadvantages the following circuit hook-up and magnet structure was developed.

The tail light magnet and circuit is believed to be illustrative. The bulbs used in the tail light being of 3 candlepower, and the battery developing an E. M. F. of 6 volts, the current passing through the circuit by test was found to be about 0.59 ampere. With these values as a basis a coil was made using #22 single cotton covered magnet wire with approximately 244 turns. A magnet made in accordance with the above formula when connected in series with the tail light bulb was found to operate satisfactorily. The above procedure is followed in winding the coils for the 15 candle-power stop light bulb and the 21 candle-power head light bulbs, the number of turns or the gauge of wire being varied so that each of the magnets would exert approximately the same amount of pull on the members 98 with the least resistance to the passage of current therethrough.

Referring for the moment to Figure 11, the running light circuits are preferably as follows. The main light switch 111 is closed and current then passes from battery 112 through wire 113 to switch 111 through contact 114 through wire 115 to contact 107, through coil 104 to contact 108 on the end of core 81, through wire 117, through the tail light bulb 118 to the ground. The initial flow of current through the circuit to the tail light is relatively large and consequently the member 98 is drawn to, and makes contact with head 82 of core 81 through contact 102. Upon the heating of the tail light filament the current drops but as contact is made at head 82 almost simultaneously with the lighting of bulb 118, the current passing through contact 114 divides and part of the current passes through core 81, contact 102, member 85, through bulb 66 of the indicator, support 12 and then to the ground. The indicator bulb at this time is in a closed circuit and lighted, and the current passing thereto supplements the current passing to tail light 118 and augments the pull of coil 104 thereby overcoming the drop in current to the tail light 118. By experiment it was found that the current to bulb 66 was about 0.15 ampere and this current flow, together with the current flow of 0.59 ampere to the tail light 118, was found to be sufficient to hold the contact 102 on head 82 of core 81 against the pull of the spring member 85 and the tendency of member 98 to bounce free in response to road vibrations.

However, if for any reason the circuit through the tail light 118 should be opened, the current passing through coil 104 to the indicator bulb 66 is insufficient to overcome the pull of member 85, and the indicator light circuit is accordingly broken by the return of member 98 to its normal open circuit position and the indicator light 66 will be extinguished.

In addition to the undesirable results just mentioned, it was found that due to the compact arrangement of the magnets that the tail light magnet and the stop light magnet were energized by induction from the adjacent headlight magnets and their operation was therefor impaired and the indicator lights associated therewith failed to truly disclose the condition of the tail light and stop light. In order to overcome this undesirable result it was found desirable to wind the separate coils of each set of the headlight switches in opposite direction. By this novel coil construction and arrangement the magnetic interference was eliminated due to the opposing magnetic field set up by the headlight magnets and the tail light and stop light magnets were energized only when current passed through their respective coils. If desired, each of said magnets may be shielded from the others by use of suitable metal sleeves or in any other suitable manner. Although the latter method of preventing the magnetic interference may be resorted to it is preferable that the coils be wound in opposite directions as just pointed out.

From the above description of the circuit it will be clear that when the main light burns out or the circuit thereto is broken the indicator bulb will immediately be extinguished and the operator will be apprised of trouble somewhere in the circuit associated with the particular indicator bulb that has gone out. This method of indication wherein indicator bulb 66 is lighted only when its associated main bulb is lighted is of extreme importance and is one reason for the success of the present invention. To illustrate, we will for the moment assume that main switch 111 has been turned to "on" position. At this time the head lights and tail light 118 should be on but assume that tail light 118 is not lighted due to a broken filament. Now if the circuit were so arranged that the indicator bulb 66 would light only when the tail light had failed, and the particular bulb 66 associated therewith was also broken or burnt out, the indicator would indicate that tail light 118 was burning. Such an indication under the conditions above mentioned would be erroneous and the operator would proceed thinking his lights were working properly. With the circuit of the present invention, however, the tail light indicator partition would be dark and the operator would be promptly apprised of existing trouble in his lighting system and would immediately investigate and remedy the trouble. If the main light 118 were to light upon operation of switch 111 with the circuit of the present invention connected with indicator bulb 66 and the indicator bulb failed to light the operator would immediately investigate and find that the indicator bulb was broken and not functioning. This failure of bulb 66 would not, however, cause the tail light to be extinguished and the vehicle could continue in safety to a service station and have indicator bulb 66 replaced. The advantages of the present circuit arrangement will be clearly appreciated from the above discussion.

Upon closing of the main switch the circuits to the headlights are simultaneously completed from battery 112, wire 113, contacts 121 of the main switch 111, wires 122 to contacts 123 of foot control dimmer or beam switch 124, through either contacts 125, wires 126, contacts 107, coils 104, contacts 108, wires 126, through filaments or bulbs 128 to ground or through contacts 131, wires 132, contacts 107, coils 104, contacts 108, wires 132, through filaments or bulbs 134 to the ground. The position of switch 124 connects either one or the other of the above mentioned circuits to the filaments or bulbs 128 or 134 and since the indicator lights are controlled by electromagnetic switches in the circuits between switch 124 and the filaments or bulbs 128 or 134, the indicator bulbs associated with one or the other of said branches will light in the manner just described in connection with tail light 118.

The circuit to the stop light is not affected by operation of the main switch, since wire 113 is continued across to contact 135. The stop light circuit and its associated indicator light 66 will therefor operate at all times upon the closing of brake switch 136 in response to the operation of the foot brake. The circuit for the stop light is completed from battery 112, wire 113, contact 135, wire 137, switch 136, wire 138, contact 107, coil 104, contact 108, wire 139, stop light 141 to the ground. The operation of the indicator bulb in connection with stop light 141 is identical with that previously described, therefore a detailed discussion thereof will be omitted.

It will be noted that the coils of magnets 55 associated with tail light 118 and stop light 141 are wound in an opposite direction from the other magnets 55.

A further advantageous feature of the present invention is the ease with which the indicator may be adapted to indicate the operation of additional running lights, such as left and right turn signals, etc. To adapt the indicator for this purpose, it is preferably provided with a slightly different red Catalin disk 39a (Figure 12) and a modified circuit arrangement (Figure 13).

The disk 39a is provided with apertures 145, 146 and 147. Aperture 145 is in the form of an arrow tail and this aperture is lighted upon operation of the brake in the manner previously described and is also operated upon actuation of the turn signal switch. The apertures 146 and 147 are connected through appropriate circuits to the left and right turn arrow heads and the retained apertures 74 are illuminated upon the lighting of either of the head light filaments or bulbs 128 and 134. In this use of this disk 39a it is to be understood that the corresponding apertures 77 of cover 42 will be likewise modified and that the upper apertures 72 of disk 38 will be omitted.

A suitable circuit is shown in Figure 13. While it is preferable to utilize the current to the indicator bulbs 66 for augmenting the running light current to thereby strengthen the magnetic pull on switches 55 it is nevertheless possible to reverse the switch terminals and connect the core 81 ahead of the coil 104 so that upon operation of the switch 55 the current will pass through the core without first passing through the coil 104. This modified alternative electromagnetic switch circuit is also included in Figure 13. It will be understood, however, that, if desired, the connections described in detail in connection with Figure 11 can be used. In Figure 13 the circuit to the tail light is made from battery 112, through wire 113, to the main light switch 111, to contact 114, to wire 115, contact 108, coil 104, contact 107, wire 117, tail light bulb 118 to the ground. The passage of current through coil 104 causes the latter to attract member 98 and close the indicator bulb circuit from contact 114, through core 81, head 82, contact 102, member 85, lamp socket contact 94, lamp bulb 66, socket 52, support 12 and dash 10 to the ground. It will be apparent from an inspection of this circuit that the current to bulb 66 does not pass through coil 104 and as a consequence the pull exerted upon member 98 is not as great as that resulting from the circuit shown in Figure 11 and all tendency for switch 55 to remain closed after current flow through coil 104 to the tail light 118 stops, is removed. Such a hook-up has proven to be very satisfactory in operation and permits the use of a more flexible member 85. Due to this last mentioned fact the clearance between contact 102 and head 82 need not be carefully adjusted as is necessary in the previously described circuit to prevent sparking or hanging of contacts 102 and the flashing of indicator bulbs 66.

The circuit to the headlight filaments or bulbs 128 and 134 has been modified in this form of the invention so that the indicator bulb switches 55 are placed between the main switch 111 and the foot beam control 124. This change causes the lowermost apertures 74 to be lighted whenever either of the headlight filaments or bulbs 128 and 134 are lighted. In other respects the circuit is the same as that described in connection with the previous modification, with the exception that the magnetic switch terminals are reversed as described in connection with the tail light circuit of Figure 13.

The circuit to the stop light is completed in the same manner hereinbefore described through wire 113, contact 135, wire 137, switch 136, wire 138, contact 108, coil 104, contact 107, wire 139 and bulb 141 to the ground. It will be seen that the contacts to switch 55 have been reversed as described in connection with the tail light, and the operation of the indicator is modified to the extent mentioned in connection therewith.

The circuit from this point on is in addition to the circuits described in Figure 11 and is added to include the indication of the turn signal lights. The circuit to the turn signal is completed from contact 151 of main light switch 111. The wire 113 is provided with a branch 152 so that the contact 151 is a line contact at all times. From contact 151 the circuit is continued over wire 153 to the turn signal switch 154. Switch 154 is provided with contacts 155 and 156 which provide terminals for the left and right turn arrow heads respectively. From contact 155 the circuit to the left turn arrow head is continued over wire 157, contact 108, coil 104, contact 107, wire 158, light bulb 159 to the ground. From contact 156 the circuit to the right turn arrow head is completed through wire 161, contact 108, coil 104, contact 107, wire 162, light bulb 163 to the ground. The operation of the switches 55 and indicator bulbs 66 included in these circuits is the same as that described in connection with the tail light 118 of the present figure and a detailed description thereof is not believed necessary.

Upon operation of the switch 154, either one or the other of the above circuits is energized and the associated right or left hand arrow 146 or 147 of the indicator is lighted. In order that a large and readily discernible signal will be displayed, it is desirable to illuminate the stop light, which in this modification is identical with the aperture 145 of the indicator light, simultaneously with the arrow heads. In the present illustrated circuit diagram the stop light 141 is lighted by switch 154 along with either of the arrow head lights 159 and 163. The circuit for stop light 141 is completed from contact 164 of switch 154, over wire 165 to contact 166 on wire 138. From an inspection of Figure 13 it will be seen that the contact 166 is so positioned that it is not affected by operation of the brake switch 136. From contact 166 the circuit is continued over wire 138, contact 108, coil 104, contact 107, wire 139, light bulb 141 to the ground.

It will be readily seen that upon operation of the switch 154, the circuit to one or the other of lights 159 and 163 will be energized simultaneously with stop light 141, and due to the fact that switch 154 is located in these circuits between battery 112 and switches 55 the indicator bulbs 66 behind apertures 146 or 147 and aperture 145 will be lighted simultaneously. A very effective and simple indicator light is therefor provided which will be capable of operation to indicate the failure of any of the many lights now in common use on a motor vehicle.

In Figure 14 a slightly modified form of indicator is shown. The indicator here shown embodies many parts which are identical to the parts shown in the preferred form and these parts will be given the same reference numerals and a detailed description thereof will be omitted. The indicator 11 in this form of the invention is adapted to be mounted within an aperture 171 provided in dash 10. In order to accomplish this purpose a supporting plate 172 is secured to the dash 10 by nut and bolt assemblies 173. Plate 172 covers aperture 171 and is provided with sockets 52 and the studs 48 in the manner described in connection with Figures 1–10. The housings 14 and 54 are constructed and mounted thereon in the manner previously described with the exception that the partitions in housing 54 are omitted.

The switches 55a of the present modification comprise a core 81a having a groove 174 adjacent one end thereof and a thread portion 175 at the other end. The core 81a is provided with an insulating sleeve 84 identical to that previously described. The groove 174 is adapted to receive a spring contact member 176 and an insulating washer 177. Contact 176 connects the core 81a with the contact 94 of socket 52. The coil 104 is wound in accordance with the previously described modification and the ends thereof are connected to contact posts 178 and 179.

A post 180 is threaded into cover 61 and a nut and washer assembly 180' locks the post 180 in adjusted position. Post 180 extends into casing 54 beyond the inner ends of electromagnetic switches 55a. The inner end of post 180 is threaded at 181 and a nut 182 is screwed thereon. A multiple switch member 183 is placed over the thread end 181 and is secured in adjusted position thereon by a nut 184.

Member 183 consists of a central securing hub 185 and radially extending flexible spring arms 186. The hub 185 and spring arms 186 are preferably of a non-magnetic material such as copper or the like. Each arm 186 extends out over one of the cores 81a and carries a cylinder 187 of iron or other magnetic material. The material 187 is in alignment with the end of core 81a and is adapted to be drawn into contact with the copper contact member 188 disposed in the center of its associated core 81a upon the energization thereof. The contact 188 is of brass or copper and since it is very small there is no tendency for the member 187 to hang after the coil 104 is deenergized.

The operation and circuits of the present modification are slightly different from the previously described system. In this form of my invention contact posts 178 and 179 are adapted to be connected in series in the circuit of the motor vehicle light, the operation of which is to be indicated by the bulbs 66 associated therewith. Upon closing main switch 111 of the vehicle light circuit, a current passes through the coil 104 associated with the closed lighting circuit and the member 187 is drawn toward and into engagement with the contact 188 carried by the associated core 81a, to which it is responsive. The engagement of contact 188 and member 187 completes a circuit from the battery 112 through a direct power wire 191 which is secured to the washer of the nut and washer assembly 180', through post 180, spider 183, contact 188, core 81a, contact 176, contact 94, light bulb 66, socket 52, support 172, dash 10 to the ground. The circuits through all of the light bulbs 66 are provided with current through wire 191 and post 180, and it will therefore be seen that immediately upon energizing any one of the coils 104 of switches 55a, the current from post 180 is divided, due to the contact of an additional arm 186 and the associated light bulb 66 is lighted. Upon the breaking of the main light circuit for any reason the spring arms 186 break the connection at 188 and the indicator bulb is extinguished.

If desired a rubber cover 192 may be placed over the exposed end of housing 54 as seen in Figure 14. Cover 192 protects the binding posts and the bared wires from moisture. If desired each of the indicator bulbs 66 can be placed in an individual casing and disposed at any point in the vehicle where it may better serve its purpose and likewise the common housing can be placed in any desired position.

By modifying the indicator 11 to provide eight partitions instead of six a circuit like that shown in Figure 11 may be used to operate the indicator. The only addition needed would be the turn signal switch, turn signal arrow head bulbs, and a wire from the turn signal switch to the stop light if the turn signal was designed to work in conjunction therewith.

In Figures 16 and 17, a modified switch member 85 is secured to core 81 in the same manner as that previously described. In the present instance, however, the washer 86 is replaced by a washer 86a which takes the form shown in Figure 16. Washer 86a is provided with suitable apertures 199 which are adapted to receive the ears 91 for securing the washer to member 85. It will be noted that washer 86a contacts the converging walls of the compartment along its extended edges 201. This contact of washer 86a provides a support for reenforcing the support of the magnetic switch due to its threaded engagement in the cover 61.

Washer 86a is furthermore provided with circular openings 202 which are adapted to receive the downwardly extending portions 203 of legs 204 which are provided by a U-shaped stop member 205. The extremities 206 of legs 204 are bent up and firmly embedded in the under face of washer 86a. Through the cooperation of extremities 206 and the parallel spaced portions 207, the member 205 is firmly secured to washer 86a.

The legs 204 of stop member 205 are adapted to be freely received in notches 208 provided in diametrically disposed relation in member 98. This free fit of legs 204 in notches 208 guides members 98 in their movement into and out of engagement with contact 82. Due to the cross bar 209, the outward movement of members 98 is positively limited. The distance between bar 209 and the contact 82 is so proportioned that the spring member 85 cannot be moved beyond its adjusted position and the adjustment of members 98 is therefor permanently assured. In order to vary the adjustment of the members 98 it is only necessary to bend bar 209 in or out at its center as desired. In addition to providing a definite stop and adjustment for the member 98 the member 205 will to a great extent prevent the bouncing of member 98 since contact with bar 209 is made when leg 89 of member 85 is under slight tension.

In the present form of the invention due to the fact that member 98 when in its disengaged position abuts cross bar 209 under influence of the spring arm 89, the undesirable bouncing of the member 98 due to road vibrations is eliminated. Furthermore, the use of the structure of Figures 16 and 17 will prevent the member 98 from flying beyond its adjusted disengaged position under influence of road vibrations and the breaking of the magnet circuit by opening of the main control switches or breakage of the main light conduits. This structure therefor insures proper adjustment of contact clearances at all times.

From the above description it will be clear that the present invention provides very simple and effective means for controlling the movement and adjusting the contact (members) carrying members 98. If desired this structure might be utilized in the form of invention shown in Figures 1–10 regardless of the strength of the spring action in members 85 although it is primarily designed for use where the arm 89 is very flexible.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A partition member adapted to divide a housing into a plurality of compartments comprising a flat plate having a longitudinally centered transverse slot extending from one edge to the longitudinal center thereof, and a pair of substantially V-shaped plates having short flat portions at their apexes and transverse slots extending from one edge of said flat portions to their longitudinal centers, said V-shaped plates being disposed back to back with the slots in alignment and with the unslotted portions thereof in the slot in said flat plate and the slots therein receiving the unslotted portion of said flat plate.

2. The combination defined in claim 1, wherein said flat plate is provided at the corners opposite said slotted edge with protruding loops adapting said partition for attachment to a supporting element.

3. A casing adapted to house an indicator bulb comprising a hollow body member; a transverse partition member disposed in said body member; a cover for one end of said body member; means on said partition member for securing said cover thereto; securing means for engaging said cover and said last mentioned means and drawing said partition member and said body member into intimate contact with said cover to effect a unitary assembly of said cover, partition member and body member; a supporting member abutting the opposite end of said body member and having apertures therein; studs secured in said apertures and protruding from one face of said supporting member; looped portions on said partition member extending through said body member and receiving the protruding portion of said studs and means threaded on said protruding portions of said studs for securing said unitary assembly in place upon said supporting member.

4. A visible indicator for apprising a vehicle operator of the condition of the several vehicle running lights comprising a mounting plate, a casing on one side of said plate, a second casing on the other side of said plate, said first and second casings being secured in alignment with one another on opposite sides of said mounting plate and common means for connecting said casings to said mounting plate.

5. A visible indicator comprising a substantially flat support having ventilating apertures therein; a casing secured to one side of said support in communication with said apertures; a second casing having ventilating apertures therein secured to the opposite side of said support in communication with said first mentioned apertures, said first mentioned apertures permitting the heated air in said first mentioned casing to escape to said second casing and said apertures in said second casing venting said casing to the atmosphere whereby a ventilated dual casing indicator is provided.

6. A casing adapted to house a plurality of electrical control means comprising a hollow body member; a transverse partition member disposed in said body member for dividing said body member into a plurality of compartments each adapted to receive one of said electrical control means; an insulating cover having diametrically opposed apertures closing one end of said body member; a supporting member for carrying said casing; and studs secured in said supporting member and extending through said opposed apertures for securing said cover, said partition and said body member in assembled relation and to said supporting member.

7. A visible indicator comprising a supporting plate; a hollow cylinder on each side of said supporting plate; a cover for the exposed end of one of said cylinders; a partition plate having lugs thereon in the other of said cylinders, bolts passing through said lugs, said supporting plate and the cover on said cylinder and means on said bolts for securing said cover on said cylinder and said cylinders and partition to said supporting plate.

8. A casing adapted to house an indicator bulb comprising a supporting member; a hollow housing; a plate for transversely dividing said housing into compartments disposed in said housing and having extensions thereon at one end for engaging one end of said housing, said means also having ears thereon at the other end for receiving a set of securing screws; a cover for said other end of said housing; a set of screws threaded into said ears and engaging said cover whereby said housing, said plate and said cover are secured into a unitary assembly; said extensions extending through said housing to provide means for securing said unitary assembly to said supporting member.

ALDEN G. RAYBURN.